United States Patent [19]

Berger et al.

[11] Patent Number: 5,471,495
[45] Date of Patent: Nov. 28, 1995

[54] ELECTRIC ARC FURNACE ARRANGEMENT FOR PRODUCING STEEL

[75] Inventors: Harald Berger; Peter Mittag, both of Linz; Johannes Steins, Gallneukirchen; Gert Pfeiffer, Leonding, all of Austria

[73] Assignee: Voest-Alpine Industrieanlagenbeau GmbH, Linz, Austria

[21] Appl. No.: 974,792

[22] Filed: Nov. 12, 1992

[30] Foreign Application Priority Data

Nov. 18, 1991 [AT] Austria ................................. 2282/91
Dec. 16, 1991 [AT] Austria ................................. 2490/91

[51] Int. Cl.⁶ ............................................. H05B 11/00
[52] U.S. Cl. ........................ 373/2; 373/60; 373/82; 373/122; 75/10.63
[58] Field of Search ................... 373/2, 9, 22, 24, 373/72, 79, 80–84, 105, 106, 108, 50–53, 42, 45, 122, 123, 69; 75/10.34, 10.1, 10.38, 10.41, 10.61, 10.63, 10.66

[56] References Cited

U.S. PATENT DOCUMENTS

| | | | |
|---|---|---|---|
| 1,542,562 | 6/1925 | Levoz | 373/61 |
| 2,382,534 | 8/1945 | Baily | 75/10.38 |
| 3,976,472 | 8/1976 | Linder | 75/10 R |
| 4,001,008 | 1/1977 | Kurt | 75/11 |
| 4,076,954 | 2/1978 | Linder | 373/42 |
| 4,146,390 | 3/1979 | Widell | 75/11 |
| 4,147,887 | 4/1979 | Yasukawa et al. | 373/89 |
| 4,740,989 | 4/1988 | Steipe et al. | 373/2 |
| 4,897,852 | 1/1990 | Dosaj et al. | 373/22 |
| 5,153,894 | 10/1992 | Ehle et al. | 373/80 |
| 5,264,020 | 11/1993 | Ehle et al. | 373/80 |

FOREIGN PATENT DOCUMENTS

| | | |
|---|---|---|
| 0240485 | 3/1987 | European Pat. Off. . |
| 2218397 | 9/1974 | France . |
| 2276386 | 1/1976 | France . |
| 2611876 | 9/1988 | France . |
| 216482 | 12/1984 | German Dem. Rep. . |
| 1508256 | 4/1970 | Germany . |
| 2944269 | 4/1982 | Germany . |
| 3241987 | 6/1984 | Germany . |
| 3620517 | 1/1987 | Germany . |

*Primary Examiner*—Tu Hoang
*Attorney, Agent, or Firm*—Hopgood, Calimafde, Kalil & Judlowe

[57] ABSTRACT

There is disclosed an electric arc furnace for the production of steel by melting scrap, in particular iron scrap, and/or sponge iron and/or pig iron as well as fluxes in a furnace vessel, into which at least one graphite electrode projects, which is displaceable in its longitudinal direction, wherein an electric arc is ignited between the graphite electrode and the charging stock. To achieve a particularly high energy input, the graphite electrode projects into a lower part of the furnace vessel from aside and the lower part, in the region of the graphite electrode, has an enlargement radially protruding outwardly relative to the upper part.

28 Claims, 6 Drawing Sheets

ELECTRIC ARC FURNACE ARRANGEMENT FOR PRODUCING STEEL

BACKGROUND OF THE INVENTION

The invention relates to an electric arc furnace for the production of steel by melting scrap, in particular iron scrap, and/or sponge iron and/or pig iron as well as fluxes in a furnace vessel, into which at least one graphite electrode projects, which is displaceable in its longitudinal direction, wherein an electric arc is ignited between the graphite electrode and the charging stock.

1. Field of the Invention

Conventional direct current arc furnaces for melting scrap that allow for a somewhat higher energy input comprise a single concentrically located graphite electrode perpendicularly arranged in the furnace vessel. The energy input feasible, which depends on the secondary current, is limited by the maximum diameter possible of the graphite electrode. At present, a maximum energy input with furnaces of this type is feasible by means of electrodes having diameters of about 700 mm.

However, electrode diameters of this magnitude and intended larger ones call for extremely elaborate structures due to the extensive masses, forces and moments occurring and involve disadvantages during the operation of the electrode clamping device, electrode supporting arm, electrode lifting device and its guide, high-current transmission ropes, etc.

Besides, it is difficult to produce electrodes of such large diameters in sufficient quality. Moreover, the energy input via a single electric arc is concentrated on a site more or less in the center of the furnace and is rendered even more difficult by magnetic influences acting on the electric arc at high powers.

2. Description of the Prior Art

With conventional rotary-current arc furnaces, such as, e.g., those according to DE-C-29 44 269, FR-B-2 218 397 and DE-A-32 41 987, a perpendicular crater is melted into the scrap by three electrodes arranged in the center on a partial circle and the remaining scrap is dissolved thereafter. The energy of the hot offgases rises through the empty crater unutilized, thus causing excessive heating of the lid and—as also happens with conventional direct current arc furnaces—a large glowing length of the electrode, which causes intensive lateral consumption of the same. Moreover, very sturdy electrode supporting arms and lifting beams with heavy guides are necessary for the electrodes in order to control the forces and vibrations also brought about by the high currents applied. Such means constitute an essential investment cost factor, rendering the conventional rotary current arc furnace more and more expensive and its operation cumbersome.

Furthermore, it is known from EP-B-0 240 485 to provide for several plasma burners as a heating means for a furnace comprising a shaft and a consecutively arranged hearth furnace to produce steel from scrap, which plasma burners are arranged obliquely relative to the furnace axis and peripherally project inwardly from outside. However, plasma burners are limited in their efficiency by employing a tungsten electrode, and there is the constant danger of leaking water.

OBJECT OF THE INVENTION

The invention aims at eliminating these disadvantages and difficulties and has as its object to provide an arrangement of the initially defined type which renders feasible a particularly high energy input at low investment, operation and maintenance costs and which also offers a high operational safety and availability.

SUMMARY OF THE INVENTION

In accordance with the invention, this object is achieved in that the graphite electrode projects laterally into a lower part of the furnace vessel from aside and the lower part, in the region of the graphite electrode, has an enlargement radially protruding outwardly relative to the upper part.

With the electric arc furnace according to the invention, the electric arc burns towards the charging stock approximately in the longitudinal direction of the electrode axis, the electric arc thus burning a cavern or cavity into the side of conical pile of charging stock. The super-imposed charging stock automatically crashes or collapses into the cavern or cavity, and thereby is exposed to the electric arc and thus is melted.

By the fact that the graphite electrode projects from aside or from a side thereof into the furnace vessel lower part that is radially widened relative to the furnace vessel upper part, the graphite electrode is thus well protected against the falling down of the charging stock. The graphite electrode is advanced only for igniting the electric arc and for superheating the steel bath formed by the scrap after the complete melting of the same. During melting of the scrap, the electrode tip suitably is kept beyond the ground plan of the upper part of the furnace vessel.

The hot gases forming during melting are sucked off upwardly through the scrap column, thus heating the scrap. The laterally penetrating graphite electrodes themselves are projected from these hot gases to the major extent such that the graphite electrodes only have short glowing lengths and are burnt off laterally to an accordingly slight extent.

A plant for the production of molten metal from ores is known from U.S. Pat. No. 1,542,562. This plant comprises a shaft forming an upper part of the furnace vessel as well as a lower part radially widened relative to the former and into which electrodes lead, as well as a conical elevation provided in the center of the bottom of the furnace vessel and destined to divide the ore column into a relatively thin-walled jacket layer to enable the reduction and melting of the ore.

The electrodes reaching towards the ore column heat the ore either by electric resistance or by radiation of an electric arc burning between two more closely adjacent electrodes that are inclined relative to each other. This known plant is a reduction furnace with a very low output limited by the wear of the conical elevation. Moreover, metallurgical operations in the liquid phase under energy supply through the inclined electrodes are not feasible.

According to the invention, it is possible for the enlargement to extend either annularly about the upper part in one embodiment—wherein the enlargement must not form a closed ring in any event, but may be interrupted at the tapping means—or only in the region of entry of the graphite electrode into the lower part in another preferred embodiment. According to the latter embodiment, the enlargement forms a so-called "electrode chamber", in which the electrode tip is disposed, that is, positioned so as protected during charging. Suitably, the electrode chamber has a width extending in the peripheral direction of the lower part, that is, three to seven times the electrode diameter. Thereby assuming a more efficient gas flow through the scrap column present in the furnace interior and also the optimum protection of the graphite electrodes.

According to a preferred embodiment of the electric arc furnace of the invention, the graphite electrodes are oriented obliquely downwards to the bottom of the furnace vessel, whereby it is possible to direct the electric arcs approximately perpendicular onto the surface of the conical charging stock pile. The oblique arrangement of the electrodes also enables an efficient superheating of the melt after the complete melting of the scrap as well as the realization of the metallurgical operations, such as refining, deoxidizing, alloying, etc., carried out in a conventional electric arc furnace.

The electric arc furnace according to the invention may be designed as a rotary current furnace including three, or a multiple of three, graphite electrodes or as a direct current furnace including a plurality of graphite electrodes.

If the electric arc furnace is designed as a direct current furnace, the graphite electrodes suitably are connected as cathodes and a bottom anode is provided in the bottom of the furnace vessel.

With the electric arc furnace designed as a direct current furnace, it is, however, also possible to connect at least one graphite electrode as a cathode and at least one electrode as an anode. With this configuration, the wear of the anodically connected graphite electrode, which usually is elevated with conventional electric arc furnaces including anodically connected graphite electrodes and may amount up to three times the wear of the cathodically connected graphite electrode, is avoided, because the graphite electrode is subjected to special cooling measures in accordance with the invention. Thus, the operation of a direct current arc furnace has become feasible partially or completely without a bottom anode and hence without a liquid sump.

Suitably, the graphite electrodes are electrically connected independent of each other and the arrangement of the graphite electrodes is such that replacement of a graphite electrode or feeding up can be effected irrespective of the functioning of the other graphite electrodes. The continuous operation of the electric arc furnace is feasible without interruption of the current supply to the other graphite electrodes. Hence, the utility of the electric arc furnace is considerably increased.

Preferably, the graphite electrodes are arranged approximately on one and the same level and approximately radially symmetrical with respect to the vertical axis of the furnace vessel.

According to a preferred embodiment, gas-oxygen burner lances project into the furnace vessel from the side on at least one level above the level on which the graphite electrodes are arranged, for introducing fossil energy and for feeding oxygen, the gas-oxygen burner lances suitably being arranged radially symmetrical with respect to the vertical axis of the furnace vessel and, viewed in the direction of said vertical axis, between the graphite electrodes.

To enable particularly efficient melting, the graphite electrodes suitably are obliquely arranged on an electrode supporting means, on which they are axially displaceable as well as pivotable about an approximately vertical and an approximately horizontal axis. Thereby, the acting electric arc will always be generated to the optimum even with unilateral scrap charging.

In accordance with the invention, the support of the electrodes may be effected by means of light-weight and low-cost structures. Preferably, the graphite electrode is supported by means of supporting rollers so as to be displaceable on the electrode supporting means in the sense of its longitudinal axis.

In order to allow the melt to run out of the electric arc furnace by tilting, the electrode supporting means advantageously is movable towards and away from the furnace vessel in a direction radial with respect to the furnace vessel.

According to a preferred embodiment, the graphite electrodes are configured as hollow electrodes, whose cavities or hollow openings are connectable to a gas feed duct as well as, if desired, to a solid matter supply duct for introducing metal and/or metal oxide containing dusts and/or organic substances.

Another preferred embodiment is characterized in that the electric furnace is designed as a shaft furnace, wherein the shaft is provided with one or several closeable lateral charging opening(s) on its upper end, thus obviating a lid lifting and pivoting mechanism as well as an interruption of the melting procedure due to removing the lid present at conventional electric arc furnaces and the electrodes extending into the interior of the furnace vessel from top vertically through the lid. In addition, the danger of liquid steel spittings into the liquid sump is eliminated during charging. Moreover, melting need not be interrupted during the charging procedure, thus increasing the availability of the arrangement.

A process for the production of steel from scrap using an arrangement according to the invention, that allows for a high energy input at low costs is characterized in that, after charging of the scrap and ignition of the electric arcs, fuel gas, preferably natural gas, is fed to the electric arc through the cavities of the electrodes under cooling of the electrode tips and is decomposed there, wherein advantageously a gas mixture ($CO+H_2$) forming in the electric arc by the feeding of natural gas is allowed to rise and is afterburnt on a level above the caverns or cavities burnt in by the electric arc, thus releasing heat to the scrap.

Suitably, afterburning of the gas mixture ($CO+H_2$) is performed by burning a fuel gas-oxygen mixture.

DESCRIPTION OF THE DRAWING

In the following, the invention will be explained in more detail by way of several exemplary embodiments illustrated in the drawings, wherein:

FIGS. 3 and 4 represent a third embodiment of a direct current electric furnace in illustrations analogous to FIGS. 1a and 2a;

DETAILS OF THE INVENTION

Figure 1A:
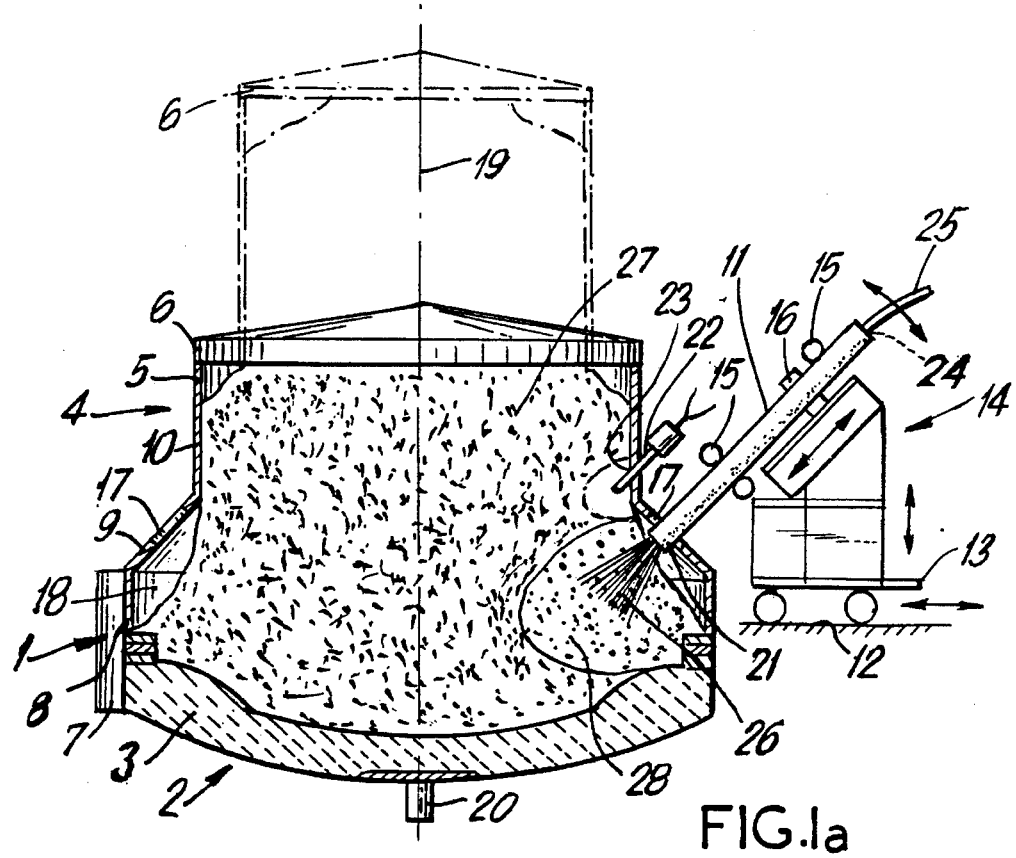
FIGS. 1a and 2a are a vertical section through, and a top view on, an electric furnace according to a first embodiment of a direct current furnace.
Figure 2A:
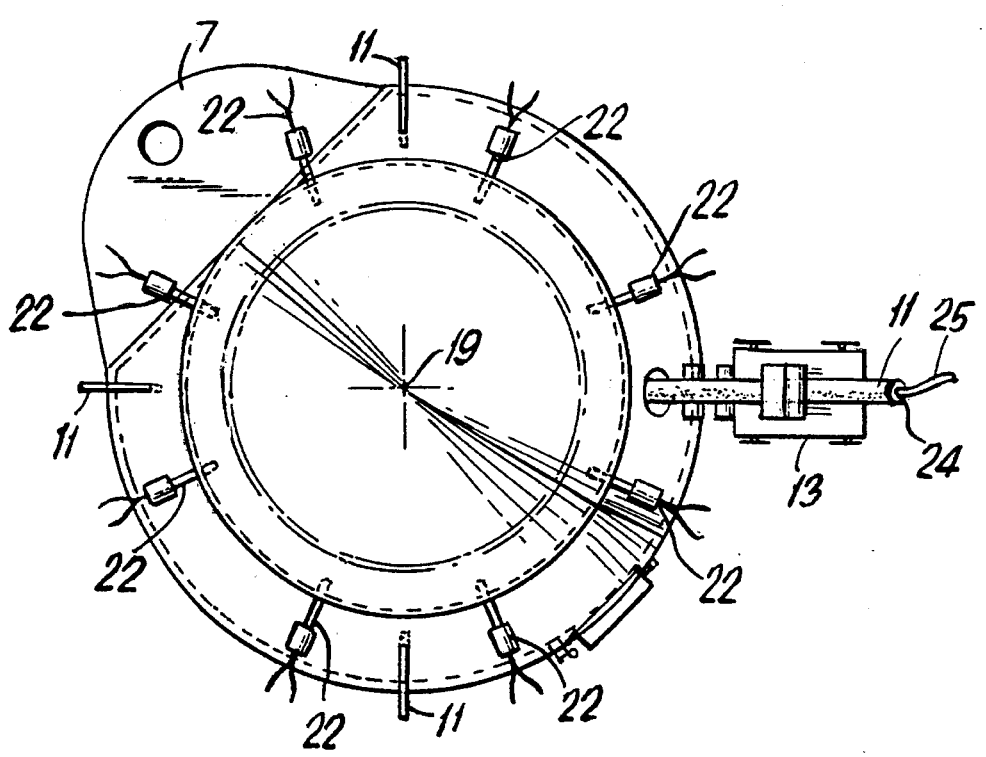

According to the embodiment illustrated in FIGS. 1a and 2a, a furnace vessel 1 of a direct current electric arc furnace comprises a trough-like depressed or concave bottom 2 lined with a refractory material 3. Above the bottom 2, there is provided a shaft 4, which is formed by a water-cooled and refractorily lined metal shell 5 closed by a water-cooled lid 6 which is removable preferably by pivoting, but also by lifting.

As is apparent from FIG. 2a, the bottom 2 has a preferably circular ground section. On one side of the tiltable electric furnace, an oriel-like projection or ledge 7 including a tap opening is provided. The furnace vessel 1 also could have an eccentrically arranged bottom tap. The shaft 4 starts to extend from the bottom 2 over a slight height by a lower cylindrical part 8 whose diameter corresponds to that of the bottom 2, then tapers by a frustoconical part 9 and, above the frustoconical part 9, again comprises an upper cylindrical part 10 of a diameter reduced relative to the bottom diameter.

Figure 1B:
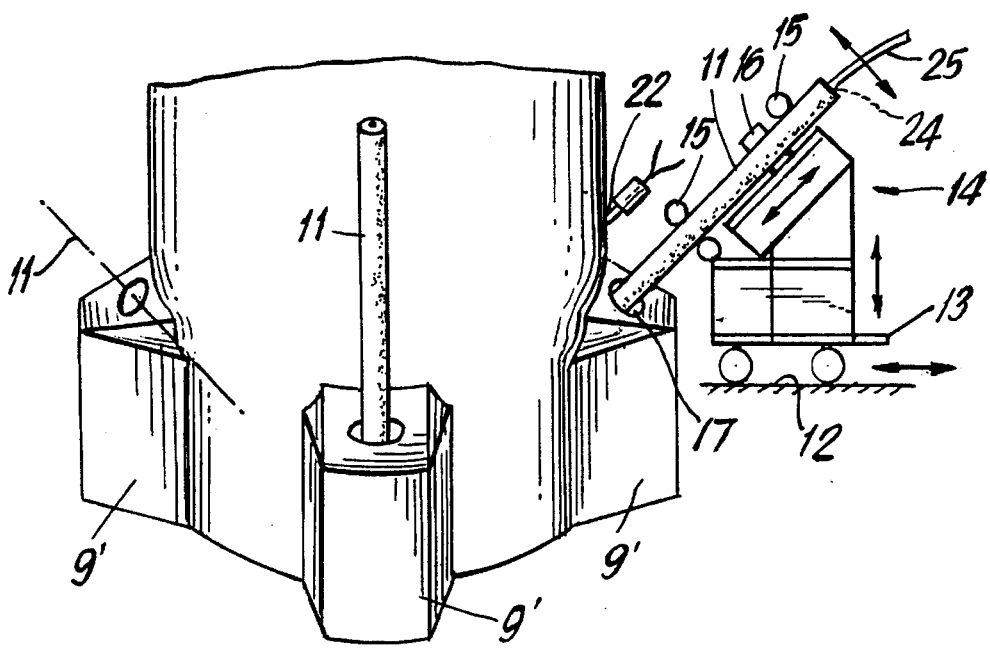
FIGS. 1b and 2b represent a further embodiment including individual enlargements in the lower part of the furnace vessel in the region of the laterally arranged electrodes.
Figure 2B:
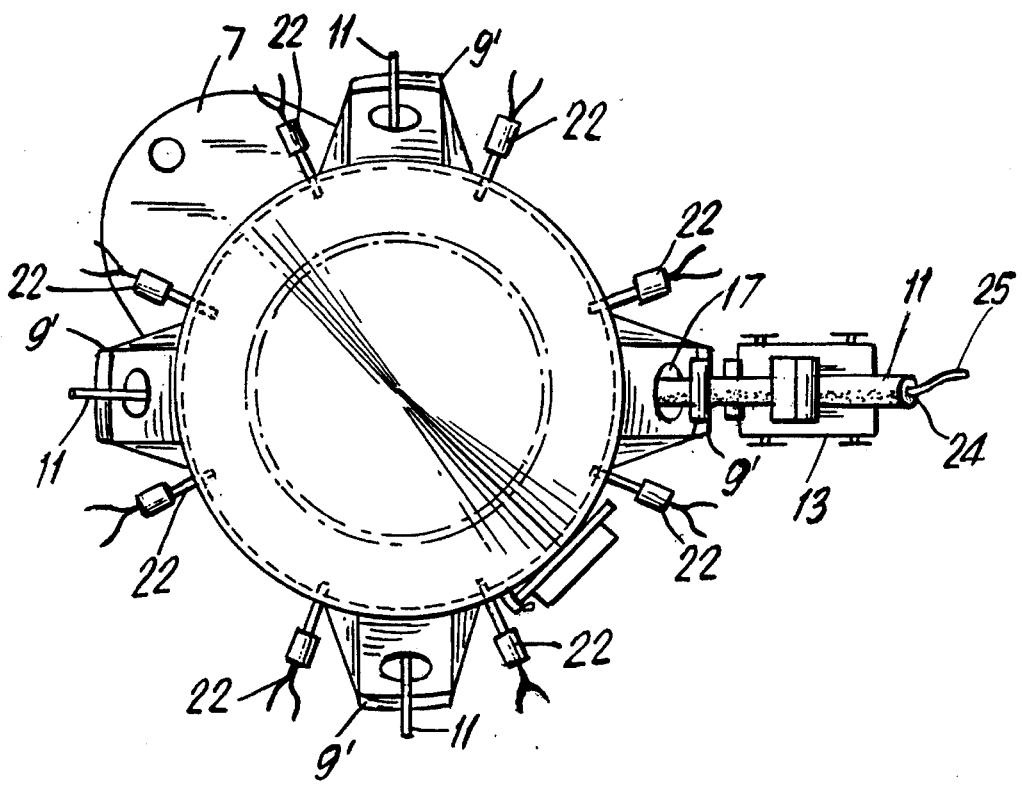

According to another embodiment (FIGS. 1b and 2b), the shaft 4 has one and the same diameter (apart from a possible conicity) continuously from top to bottom and is equipped with individual enlargements 9' in the region of the laterally arranged graphite electrodes for the introduction of the graphite electrodes 11 into the melting space.

The width of the enlargements 9' extending in the peripheral direction of the lower part 8 of the electric arc furnace is three to seven times the electrode diameter such that the enlargements 9' constitute electrode chambers surrounding the graphite electrodes 11—as far as they reach into the furnace interior—by a free space.

As a result, a better defined gas flow through the scrap column, an improved protection of the electrodes against the crashing down of scrap and the possibility of converting existing electric arc furnaces comprising perpendicular graphite electrodes to such comprising laterally arranged electrodes are ensured.

A plurality of DC electrodes 11 of graphite are arranged peripherally about the furnace. According to the exemplary embodiment illustrated, four graphite electrodes 11 are spaced 90° from each other. The graphite electrodes 11 are mounted on a working platform 12 surrounding the furnace vessel 1 by means of cars 13 movable on this platform 12. Each of these cars 13 comprises an electrode supporting means 14 that is liftable and lowerable as well as pivotable about an approximately horizontal and an approximately vertical axis, and which is equipped with rollers 15 supporting the graphite electrode 11 and with an electrode clamping means 16. Each graphite electrode is guided directly on the rollers 15 and is moved towards and away by a hydraulic cylinder engaging either directly at the electrode clamping means or at a separate device, any movement being controlled via an electrode control means. Preferably hydraulic, means serve to carry out pivotal movements as well as the longidutinal displacement of the graphite electrodes, which means, however, are not illustrated in the drawings.

The graphite electrodes 11 project into the lower part of the furnace interior 18 through openings 17 in the frustoconical part 9 or in the enlargements 9', with the inclination of the graphite electrodes 11 and the radial distance from the central axis 19 of the furnace vessel 1 being controllable as a function of the operational conditions, i.e., the amount of stock charged, the melting state and the height of the melt bath level during superheating of the melt. A single bottom anode 20 is provided centrally in the bottom 2 of the furnace vessel 1, towards which the radially symmetrically arranged graphite electrodes 11 are directed. All of the graphite electrodes 11 are disposed with their tips 21 approximately on one and the same level and, during normal operation, beyond the diameter of the upper part 10, unless the melting state of the charging stock allows for the further protrusion of the graphite electrodes 11 into the furnace interior 18.

Gas-oxygen burner lances 22 are provided on several levels above the level of the electrode tips 21, being insertable into the furnace interior 18 through openings 23 of the upper cylindrical part 10. As is apparent from FIG. 2a, preferably two of such gas-oxygen burner lances 22 are each arranged between two neighboring graphite electrodes 11.

Preferably, the graphite electrodes 11 are configured as hollow electrodes each having a central continuous cavity or through opening 24. This cavity 24 communicates with a duct 25, through which organic substances, preferably natural gas and/or solid and/or liquid hydrocarbons, and/or metal and/or metal-oxide containing dusts, are introducible.

As opposed to conventional direct current furnaces, the overall electric input is introduced into the direct current arc furnace not centrally through a single, very thick, vertical graphite electrode, but through four, or a plurality of, graphite electrodes 11 of smaller diameters on four radially symmetric sites. Thus, the power level is shifted upwards to such an extent that the output of the direct current arc furnace is no longer limited by the current loadability of the electrodes. The electrode supporting arm(s) and the lifting beam(s) are obviated.

To tilt the electric furnace during tapping, in which case the high current feeding ropes or cables, which may be designed to be thinner according to the invention due to the smaller current to be transmitted per electrode, would be particularly stressed in terms of length and torsion in conventional electric furnaces comprising a central graphite electrode extending through the lid, the graphite electrodes 11 can be moved back on the working platform 12, thus allowing for short high current transmission ropes or cables that are mechanically stressed to a very slight extent. This advantage over conventional direct current furnaces is even further increased by the fact that, according to the invention, the high current transmission ropes or cables are not affected by the pivotal movement of the lid.

Electrode feeding is effected at each of the four graphite electrodes 11 individually and independently without the remaining graphite electrodes 11 having to interrupt their operation. Consequently, the availability of the electric furnace as compared to a conventional direct current arc furnace comprising a single central graphite electrode and whose operation must be interrupted for replacing or feeding up electrodes, has been considerably increased.

If natural gas or other solid, liquid or gaseous organic substances are introduced through the hollow graphite electrodes 11, this has a cooling effect on the electrode tips 21. When leaving the graphite electrodes 11, natural gas, for instance, is decomposed by the electric arcs 26 into the components C and $H_2$, which cannot burn with oxygen at the high temperatures prevailing in the electric arc 26 during the melting procedure. In this decomposition process, energy is consumed. It is suitable to afterburn the gas mixture $CO+H_2$ forming on account of the decomposition of $CH_4$ in the furnace interior, to $CO_2$ and $H_2O$ by means of the gas-oxygen burner lances 22. The thus forming heat is conveyed to the still cold scrap 27 present in the furnace space prior to melting.

Due to the oblique graphite electrodes 11 with their oblique arcs 26, caverns or cavities 28 are melted into the scrap, whereupon the latter automatically collapses or crashes down without impinging on, or causing damage to, the graphite electrodes protectedly arranged in the lower part 8 or in the enlargements 9'. The hot gases from the meltdown procedure, which directly sweep upwards in the melted out crater without resistance and are withdrawn in conventional direct current arc furnaces comprising a vertical graphite electrode, with the electric furnace according to the invention comprising several oblique graphite electrodes rise through the scrap disposed above the caverns or cavities, thus preheating the same.

Add to this the scrap preheating that occurs in the furnace space by the afterburning process described above. It occurs until the scrap 27 has formed a liquid bath and the electric arcs 26 burn onto the liquid bath, heating and superheating the same.

After completion of the melt, the graphite electrodes are moved away from the furnace interior 18 and the electric arc furnace is tilted for tapping. After tapping, the electric arc furnace is tilted back, its lid 6 is opened, scrap 27 is charged and the lid 6 is closed again. Charging of the scrap can be effected also through lateral flaps provided in the upper cylindrical part 10 and not illustrated in the Figures. After introduction of the graphite electrodes 11 through the side, melting can be started again.

The advantages achieved by the direct current arc furnace according to the invention may be summarized as follows:

- Maximum-output direct current arc furnaces feasible because of power distribution to several graphite electrodes 11 and no limitation by electrode diameters (>150 t/h). With conventional direct current arc furnaces comprising a central graphite electrode, output is limited because of electrode dimension of the single graphite electrode (<100 t/h).
- Substantial increase in availability. In case of disturbances (e.g., electrode break, electrode feed-up, etc.) at one of the graphite electrodes 11 continued operation of the electric furnace is possible, whereas the operation of a single-electrode arc furnace must be interrupted. The electric furnace also may have a larger construction height, e.g., may be designed as a shaft furnace as indicated by broken lines in FIG. 1a. Thereby, the total scrap 27 can be top-charged in a single procedure by a cage or chute or in several portions, while the melting procedure continues to go on in the lower part without interruption. This yields an increase in production by about 10%. With a shaft-furnace configuration, a lateral charging opening may be provided for continuous charging (suitably including a sleuce for preventing the emergence of dust) so that no lid lifting and lid pivoting mechanism is required.
- Simplified structure and cost reduction of the arrangement by about 20% due to the omission of an electrode carrying arm, electrode lifting beam, beam guides, and the considerable dimensional reduction of transfos, electrode moving hydraulic means, etc.—Hence
- Significant maintenance advantages
- Improved energy input into melting stock by optimum distribution of the energy offer in the furnace space, improved controllability on account of slighter or smaller masses being in motion at the electrode system, improved scrap preheating in the furnace space by hot offgases from the caverns or cavities 26 melted out by the oblique graphite electrodes 11. Improved scrap preheating by afterburning CO from co-charged coal or $CO+H_2$ from natural gas blown in through the hollow electrode.—Hence
- Energy saving by about 50 kWh/t=about 15%, i.e., increase in output by about 10%.
- Additional saving of electrodes by about 25% due to oblique electrode arrangement: shorter glowing length of electrode, hot offgases do not sweep along the graphite electrode, thus little lateral consumption.
- No special electrode dimensions required, but small electrode diameters feasible (about 200 to 450 mm diameter), the small dimensions being all the more feasible due to the high specific conductivity ($A/cm^2$) induced by smaller diameters.
- Deflection of the electric arc due to magnetic fields at strong DC arc furnaces being avoided because of the occurrence of much smaller single currents and, thus, weaker magnetic fields on account of distribution to several graphite electrodes.

Figure 3:
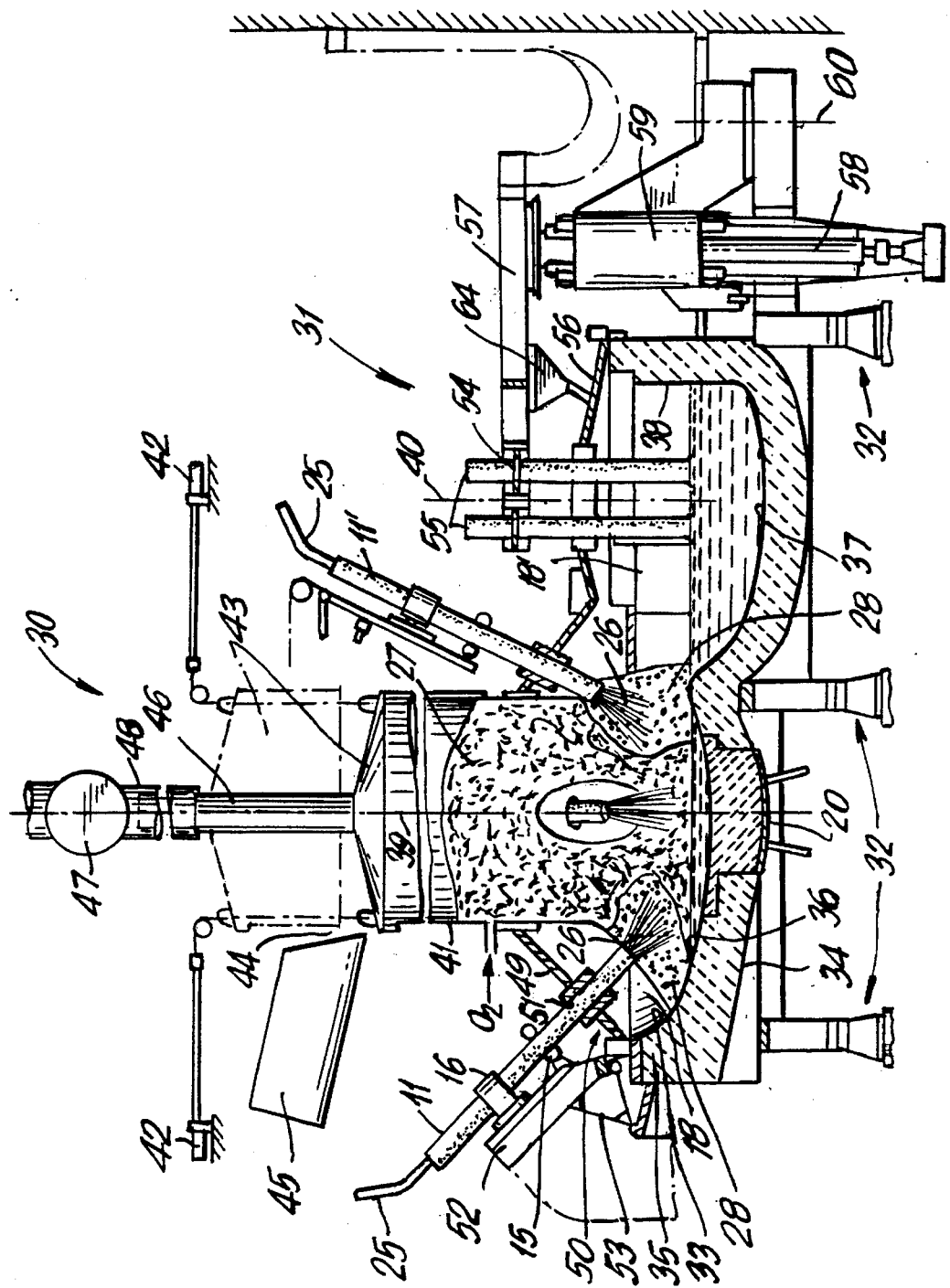
Figure 4:
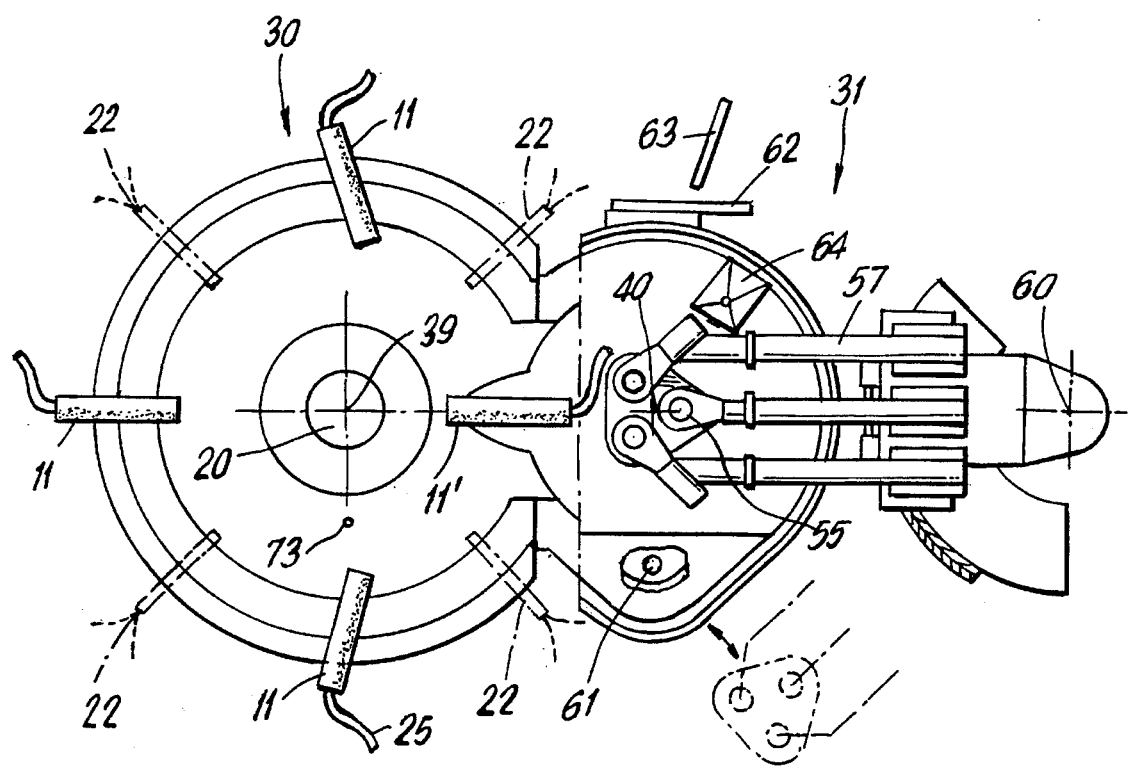

According to the embodiment illustrated in FIGS. 3 and 4, the arrangement comprises a furnace vessel configured as a shaft furnace 30 and an independent electric hearth furnace 31 separated from the shaft furnace 30, but communicating therewith, and is supported relative to the base via pivoting cradles 32.

The bottom 33 of the arrangement is comprised of a plate metal armoring 34 inwardly provided with a refractory lining 35. In the shaft furnace 30, it has a circular or oval trough-shaped bottom depression 36, which is separated from the bottom depression 37 allocated to the electric hearth furnace 31 by an overflow weir 72. To drain the bottom depression 36 for the purpose of inspection, repair or for exchanging the bottom anode 20, a tap hole 73 is provided in the bottom 33, which is eccentrically arranged. The refractory lining is raised in the region of the electric hearth furnace 31, forming coherent side walls 38 with the bottom 37, which also may be designed as water-cooled walls.

In plan view, as is shown in FIG. 4, both the shaft furnace 30 and the electric hearth furnace 31 preferably are circular; their bottoms 36, 37 contact each other somewhat tangentially. Both furnace interiors 18 and 18' communicate with each other on the site of contact, the bottom depressions 36 and 37 being separated on the site of contact by an overflow weir 72. The hearth furnace part 31 is able to receive a total charge without reaching the level of the overflow weir 72.

As is apparent from FIGS. 3 and 4, the arrangement is tiltable perpendicular relative to a horizontal axis connecting the center 39 of the shaft furnace 30 with the center 40 of the electric hearth furnace 31.

The shaft furnace 30 comprises a cylindrical shaft part 41 whose diameter is smaller than the diameter of its bottom and which is formed by a metal shell. On the upper end of the shaft part 41, a hood 43 is arranged, which is liftable and lowerable by means of pressure medium cylinders 42 and includes a recess 44 on one side such that, with the hood 43 lifted—which is illustrated in FIG. 3 in dot-and-dash lines—a charging opening for charging scrap 27 by means of a scrap chute 45 is cleared. The charging of scrap may be effected also through lateral flaps provided in the cylindrical shaft part 41, which are not illustrated in the Figures. A sleuce for seizing offgases during charging may also be provided therebetween. In the center of the hood 44, an offgas pipe 46 is provided, running into a stationary concentric exhaust pipe 48 of a larger diameter, which is connected to a suction draught 47.

The shaft furnace 30, on its lower end, is provided with a downwardly diverging lower part 50 formed by a water-cooled shell 49. This diverging lower part 50 includes openings 51 located at the frustoconical shell 49, through which graphite electrodes 11 directed obliquely relative to the bottom center project into the interior of the shaft furnace 30. The graphite electrodes 11 are mounted on consoles 52 and are axially displaceable towards the bottom 33 and away therefrom as well as pivotable by a pivoting means 53. In this manner, the inclination of the electrode axis relative to the horizontal line is adjustable by between 20° and 80° in the exemplary embodiment illustrated. A bottom anode 20 is arranged in the center 39 of the shaft furnace 30.

A further graphite electrode 11' is provided on the transition between shaft furnace 30 and electric hearth furnace 31, which electrode is arranged in a steeper manner than the remaining graphite electrodes 11 pivotably provided at the shell of the diverging lower part 50. This graphite electrode 11' preferably merely is displaceable longitudinally, but is not mounted pivotably. Its inclination relative to the horizontal line amounts to between 50° and 80°, preferably 70°.

The electric hearth furnace 31 is equipped with an electric heating device 54, which, in the exemplary embodiment illustrated, is designed as a rotary current electric arc heating, whose graphite electrodes 55 are led through a lid 56. A direct current electric arc heating is also possible. The electric arc heating also could be replaced by an inductive heating device. The graphite electrodes 55 are liftable and lowerable, and laterally pivotable about a pivot axis 60, on an electrode holder 57 extending to laterally beside the furnace and mounted on a column 59 via a lifting means 58. Heating by means of electrodes laterally projecting obliquely into the electric hearth furnace is also feasible.

Preferably, the electric hearth furnace comprises a bottom tap 61 arranged eccentrically relative to the center 40 of the electric hearth furnace 31. A working door 62 for tapping slag is provided in a side wall 38 at a distance from the bottom depression. If desired, an oxygen blowing lance 63 is introducible through this working door 62 for blowing refining oxygen into the electric hearth furnace 31. A funnel 64 is provided in the water-cooled lid 56 of the electric hearth furnace 31 for feeding alloying elements.

According to the embodiment represented in FIGS. 3 and 4, the graphite electrodes suitably also are designed as hollow electrodes and connected to a gas feed duct for suppling natural gas. Furthermore, gas-oxygen burner lances 22 for afterburning are provided in the shaft furnace 30 on several levels above the electrode tips for the purpose of efficiently preheating the scrap.

Figure 5:
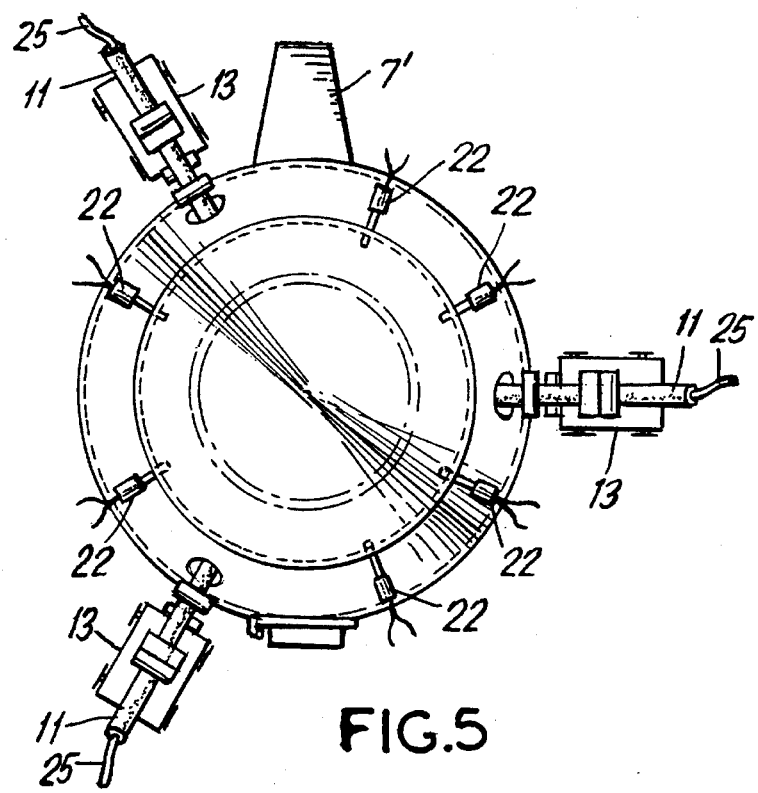
FIGS. 5, 6 and 7 depict rotary current furnaces according to the invention in illustrations analogous to FIGS. 2a and 3 to 4.
Figure 6:
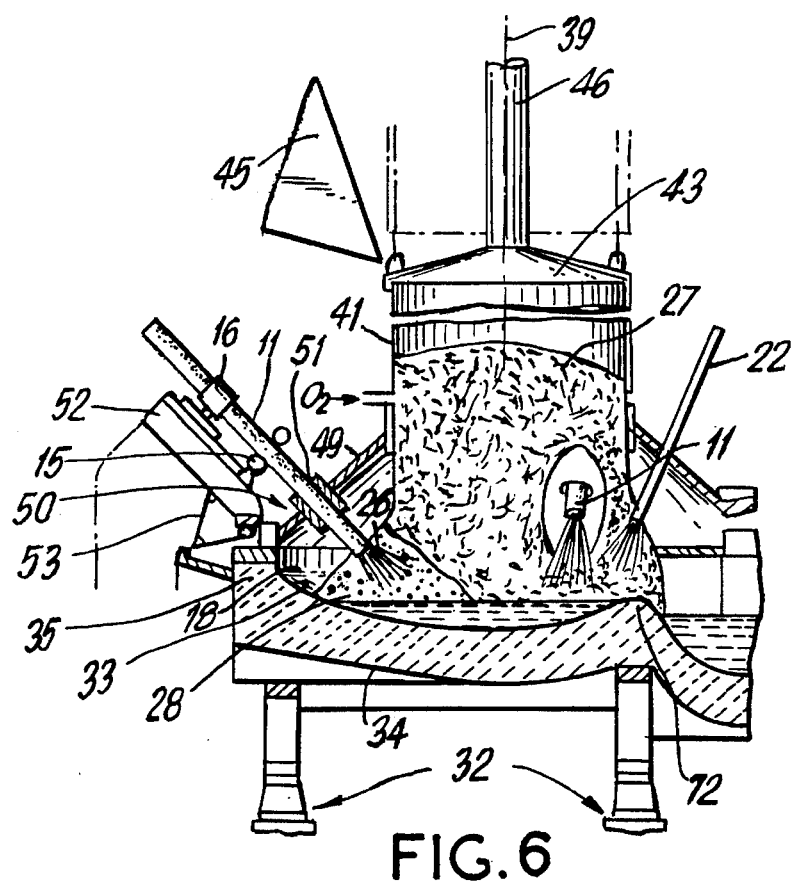
Figure 7:
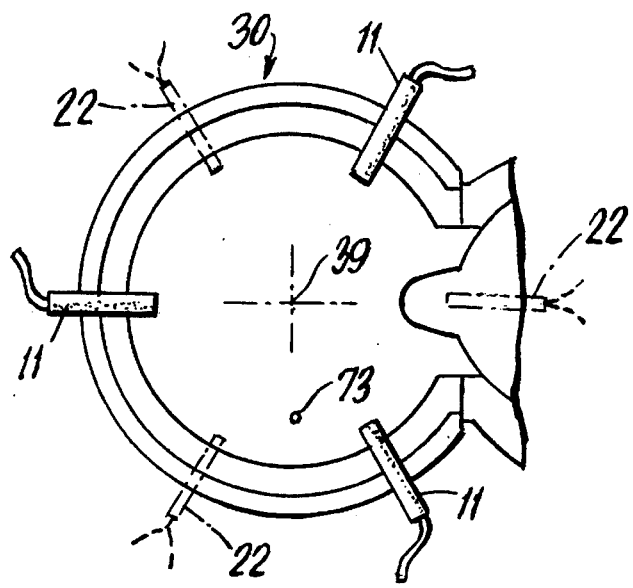

In FIGS. 5 to 7, electric furnaces are represented in illustrations analogous to FIGS. 2a and 3 to 4, which are designed as rotary current furnaces. FIG. 5 depicts an electric furnace of the type illustrated in FIG. 2a (yet with a spout tap 7'), FIGS. 6 and 7 one of the type according to FIGS. 3 and 4. These furnaces each comprise three (or a multiple of three) graphite electrodes approximately uniformly distributed about the periphery and also projecting into the furnace interior from aside and not from top through the ceiling as is the case with conventional electric arc furnaces. About the same advantages indicated in respect of the direct current arc furnace according to the invention result for the rotary current arc furnace.

Figure 8:
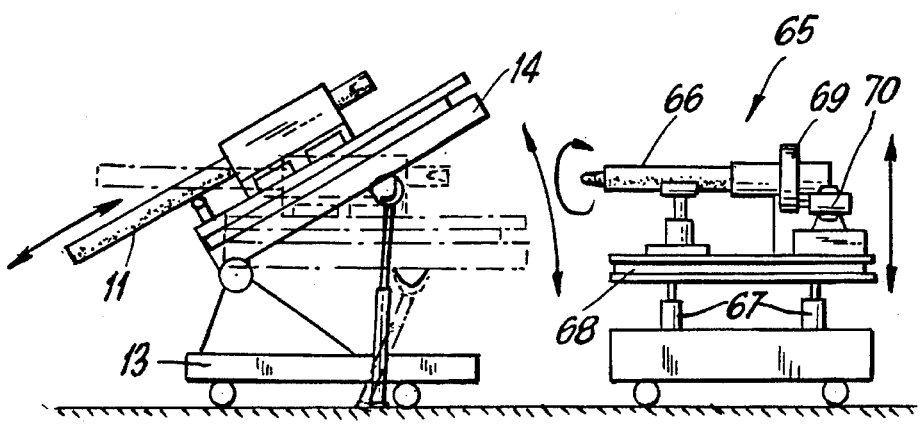
FIGS. 8 and 9 are an elevational view and a ground plan of an electrode nippling means that is particularly advantageous to the electric arc furnace of the invention.
Figure 9:
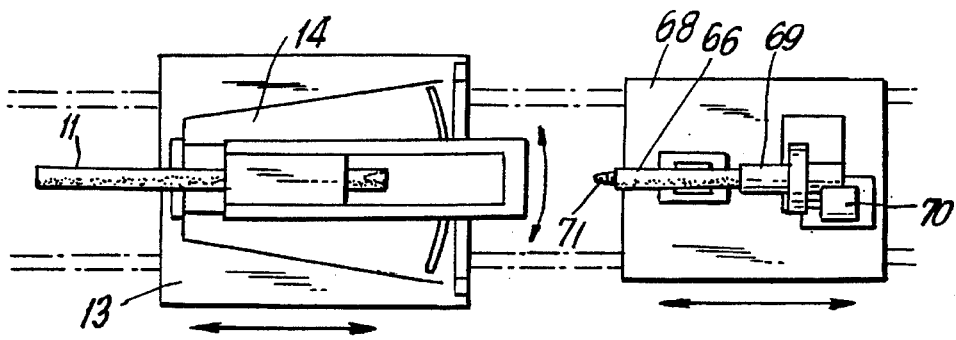

FIGS. 8 and 9 show an electrode nippling or connecting device 65, which is displaceable on the working platform 12 in the sense of the electrode supporting means 14 and serves to connect and fix a new graphite electrode piece 66 to a graphite electrode train merely mechanically, preferably automatically.

For this purpose, the electrode supporting means 14 is tilted into the horizontal line (cf. position illustrated in broken lines) after the car 13 has been moved back, so that the graphite electrode 11 registers with the graphite electrode piece 66 horizontally mounted on the electrode nippling means 65. The electrode nippling means 65 comprises a horizontal platform 68, which is liftable and lowerable by a lifting means 67 in order to bring the new electrode piece 66 to the level of the horizontally oriented electrode 11.

The new electrode piece 66 is clamped in a clamping means 69 rotatably mounted on the platform 68 and capable of being set in rotation by a motor 70. By joining the new electrode piece 66 by its conical threaded nipple 71 with the counterwisely shaped and internally threaded end of the electrode 11 and by screwing on the electrode piece 66, a stable connection can be obtained without requiring the use of a crane and any manipulations whatsoever.

What we claim is:

1. In an electric arc furnace arrangement comprising a furnace vessel having an upper part, a lower part and a bottom associated with said lower part for receiving a metal charge to be melted, said metal charge to be received comprising at least one ferrous metal selected from the group consisting of iron scrap, sponge iron and pig iron, wherein said furnace vessel has at least one graphite electrode projecting therein capable of displacement along its longitudinal axis and of forming an electric arc by ignition with said metal charge, the improvement:

wherein a region of said lower part of the furnace vessel is outwardly radially enlarged relative to its upper part to form a radially enlarged part, wherein said at least one graphite electrode projects laterally from outside of said vessel into the vessel in a region of entry into the radially enlarged part of said vessel and is arranged at a level with respect to the vertical axis of said furnace vessel, and wherein a plurality of oxygen burner lances are symmetrically radially arranged with respect to said vertical axis and horizontally disposed adjacent to said at least one graphite electrode on at least one level located above a level on which said graphite electrode is arranged for introducing fossil energy, said at least one graphite electrode being directed to a region in said lower part of the vessel adapted to receive and confine said metal charge for the melting thereof.

2. An electric arc furnace arrangement as set forth in claim 1, wherein said enlarged part extends annularly about said furnace vessel relative to the upper part thereof.

3. An electric arc furnace arrangement as set forth in claim 1, wherein said radially enlarged part of the lower part of said furnace vessel is disposed only in the region of entry of said at least one of graphite electrode projecting into said furnace vessel lower part.

4. An electric arc furnace arrangement as set forth in claim 1, wherein said at least one graphite electrode is directed obliquely downwards to said furnace vessel bottom.

5. An electric arc furnace arrangement as set forth in claim 1, wherein the furnace is a rotary current furnace comprising a plurality of graphite electrodes.

6. An electric arc furnace arrangement as set forth in claim 1, wherein the furnace a direct current furnace comprising a plurality of graphite electrodes.

7. An electric arc furnace arrangement as set forth in claim 6, wherein said graphite electrodes are cathodically connected and a bottom anode is provided in said furnace vessel bottom.

8. An electric arc furnace arrangement as set forth in claim 6 comprising at least one cathodically connected graphite electrode and at least one anodically connected electrode.

9. An electrode arc furnace arrangement as set forth in claim 6, wherein said graphite electrodes are electrically connected independent of each other.

10. An electric arc furnace arrangement as set forth in claim 5 or 6, wherein said graphite electrodes are arranged approximately on one and the same level and approximately radially symmetrical with respect to the vertical axis of said furnace vessel.

11. An electric arc furnace arrangement as set forth in claim 1, further comprising electrode supporting means for obliquely mounting said at least one graphite electrode to be axially displaceable and pivotable about an approximately vertical and an approximately horizontal axis.

12. An electric arc furnace arrangement as set forth in claim 11, further comprising supporting rollers for supporting said at least one graphite electrode on said electrode supporting means and adapted to be movable in the direction of its longitudinal axis.

13. An electric arc furnace arrangement as set forth in claim 11, further comprising hydraulic means for moving said at least one graphite electrode.

14. An electric arc furnace arrangement as set forth in claim 11, wherein said electrode supporting means is movable towards and away from said furnace vessel in a radial direction with respect to said furnace vessel.

15. An electric arc furnace arrangement as set forth in claim 11, further comprising an electrode connecting means, a clamping means and an electrode piece rotatably mounted on said electrode connecting means by said clamping means, and wherein said electrode supporting means and said clamping means are movable relative to each other in alignment.

16. An electric arc furnace arrangement as set forth in claim 1, wherein said at least one graphite electrode is shaped as a hollow electrode, and further comprising a gas feed duct connectable to said hollow electrode.

17. An electrode arc furnace arrangement as set forth in claim 1, wherein said at least one graphite electrode is a hollow electrode, and further comprising a solid matter supply duct connectable with said hollow electrode for introducing at least one of metallic and metal-oxide containing dusts and organic substances through said hollow electrode.

18. An electric arc furnace arrangement as set forth in claim 1, wherein said furnace vessel is tiltably mounted.

19. An electric arc furnace arrangement as set forth in claim 1, wherein said furnace vessel includes a concentric bottom tap.

20. An electric arc furnace arrangement as set forth in claim 1, wherein said furnace vessel includes a spout tap.

21. An electric arc furnace arrangement as set forth in claim 1, wherein said electric furnace is a shaft furnace comprising a shaft having an upper end provided with at least one closeable lateral charging opening.

22. An electric arc furnace arrangement as set forth in claim 21, wherein said shaft furnace comprises an upwardly tapering shaft.

23. An electric arc furnace arrangement as set forth in claim 21, further comprising an electric hearth furnace arranged immediately adjacent to said shaft furnace, the hearth of said furnace having an overflow weir, said electric hearth furnace being adapted to receive melt forming in said shaft furnace via said overflow weir.

24. An arrangement as set forth in claim 23, wherein said shaft furnace has a trough-shaped bottom with depression and said electric hearth furnace has an electric hearth furnace bottom shaped with a depression, said shaft furnace bottom depression being separated from said electric hearth furnace bottom depression by said overflow weir.

25. An arrangement as set forth in claim 24, wherein said shaft furnace bottom and said electric hearth furnace are tangentially disposed relative to each other.

26. An arrangement as set forth in claim 24, wherein said electric hearth furnace bottom has a tub-shaped depression relative to said shaft furnace bottom.

27. An arrangement as set forth in claim 21, further comprising a gas suction means cooperatively associated with the upper end of said shaft furnace.

28. A process for producing steel from at least one ferrous metal selected from the group consisting of scrap, sponge iron and pig iron by using an electric arc shaft furnace arrangement comprising an upper shaft part and a lower melting vessel connected thereto, said shaft part at its upper end being provided with at least one closeable lateral charging opening, and said lower melting vessel being outwardly radially enlarged relative to the upper shaft part to form a radially enlarged part with at least one graphite electrode projecting laterally into said vessel in a region of said enlarged part, wherein said electrode is arranged at a level with respect to a vertical axis of said shaft furnace arrangement and a plurality of oxygen burner lances are symmetrically radially arranged with respect to said vertical axis and horizontally disposed adjacent to said electrode on at least one level located above a level on which said electrode is arranged, and wherein said shaft furnace arrangement also includes an electric arc hearth furnace disposed immediately and cooperatively adjacent to said shaft part and said lower melting vessel, said process comprising the steps of
continuously melting a charge of said ferrous metal in said shaft furnace arrangement and thereby obtain a melt thereof,
collecting said melt in said electric arc hearth furnace,
processing said melt to steel, and heating and tapping in batches said electric hearth furnace to provide a steel product.

* * * * *

UNITED STATES PATENT AND TRADEMARK OFFICE
CERTIFICATE OF CORRECTION

PATENT NO. : 5,471,495
DATED : November 28, 1995
INVENTOR(S) : Harald Berger et al.

It is certified that error appears in the above-identified patent and that said Letters Patent is hereby corrected as shown below:

Col. 2, line 23, "By the fact that" had been replaced by --Since--.

Col. 2, line 23, after "projects" insert --laterally--;

Col. 2, line 36, "projected" should be --protected--;

Col. 2, line 64, before "projected" insert --to be-- (note page 2 of the same amendment)

Col. 3, line 1, "assuming" should be --assuring--

Signed and Sealed this

Twenty-third Day of April, 1996

Attest:

BRUCE LEHMAN

*Attesting Officer*  *Commissioner of Patents and Trademarks*